United States Patent
Kunimoto et al.

[11] Patent Number: 5,917,536
[45] Date of Patent: Jun. 29, 1999

[54] IMAGE RECORDING APPARATUS FOR MEDICAL USE

[75] Inventors: Akira Kunimoto; Youji Yamamichi; Katsuya Tanimoto, all of Hino, Japan

[73] Assignee: Konica Corporation, Tokyo, Japan

[21] Appl. No.: 08/727,974

[22] Filed: Oct. 9, 1996

[30] Foreign Application Priority Data

Oct. 17, 1995 [JP] Japan ..................................... 7-268535
Oct. 19, 1995 [JP] Japan ..................................... 7-270411

[51] Int. Cl.$^6$ ....................................................... H04N 1/21
[52] U.S. Cl. .......................... 347/247; 347/142; 250/583
[58] Field of Search .................................... 347/245, 247, 347/264, 142; 358/401, 403; 346/33 M; 250/583, 584

[56] References Cited

U.S. PATENT DOCUMENTS

4,768,099  8/1988  Mukai ...................................... 358/403
4,789,782  12/1988  Ohara ...................................... 250/583
5,111,044  5/1992  Agano ............................... 346/33 ME Primary Examiner—N. Le
Assistant Examiner—Hai C. Pham
Attorney, Agent, or Firm—Frishauf, Holtz, Goodman, Langer & Chick

[57] ABSTRACT

An apparatus for controlling a recording device includes a first input section for inputting image information items with respect to an object, and a second input section for inputting a change signal representing a change of the object. A first memory stores a plurality of the image information items inputted by the first input section, and a control section selects at least one of the image information items stored in the first memory and for controlling the recording device to record the at least one selected image information item on a recording sheet, responsive to the input of the change signal by the second input section.

14 Claims, 8 Drawing Sheets

═══ : IMAGE DATA
——— : CONTROL SIGNAL

IMAGE RECORDING APPARATUS FOR MEDICAL USE

BACKGROUND OF THE INVENTION

The present invention relates to an image recording apparatus such as a laser image writing apparatus which writes an image transmitted from a diagnostic apparatus for medical use on a film as a recording sheet by the use of a laser.

There has been available an image recording apparatus which is provided with an inputting means which inputs image signals, a storing means which stores inputted image signals, and a reproducing means which reproduces the image signals from the storing means, and records images on a film using the reproduced image signals. A laser image writing apparatus serving as the image recording apparatus mentioned above writes images transmitted from a diagnostic apparatus for medical use such as a CT or an MRI on a film by the use of a laser.

When a plurality of diagnostic apparatuses for medical use are connected to a laser image writing apparatus, films are usually stored in the order of photographing. In the case of assorting films, therefore, a patient name or a patient ID overwritten in images on each film is discriminated and films are classified by each patient. After that, the number of exposed films for the same patient is counted, and the total number of exposed films and their order are entered.

Therefore, there are problems such as: patient names and patient IDs overwritten in images vary in terms of size and position of printing out depending on the recording format and are often difficult to read; assorting work may be time-consuming because films of the same patient are not stored in the same place; even when the films of the same patient are stored in the same place, a boundary line between a patient and another patient is not clear; and, the number of exposed films and their order need to be written on each film after the assorting work.

In addition, in an image recording apparatus equipped with a sorter wherein single or plural images of each patient are recorded on a single image recording sheet, a change-over switch for a delivery sorter bin located on an operating portion has been operated so far, for the purpose of assorting for each patient for delivery, by an operator to conduct image taking-in and image output after switching delivery sorters each time a patient is changed.

In the prior art, when sorting image output sheets for each patient by the use of a sorter, it has been necessary to operate inputting of a patient ID and switching of sorters every time a patient is changed. Thus, the prior art has required complicated operations, resulting in easy occurrence of erroneous operations. In addition, change-over switches for sorters are needed, which is disadvantageous for making an operating portion small and increases the manufacturing cost of an operating portion.

SUMMARY OF THE INVENTION

The present invention has been achieved in view of aforesaid points, and its object is to provide an image recording apparatus which overcomes the disadvantages described above and thereby simplifies the film assorting work and film management work of an operator easy.

For solving the above problems and achieving the object mentioned above, the invention is represented by an image recording apparatus that compromises an inputting means which inputs image signals, a storing means which stores image signals inputted from the inputting means, and a reproducing means which reproduces the image signals coming from the storing means, and records an image on a film using the above-mentioned image signals reproduced, wherein there are provided a patient photographing information storing means which records patient photographing information, a switching means inputting commands for switching of patients for each photographing, and a control means which, when the commands for switching are inputted, makes all images of the same patient photographed until the moment of the inputting of the commands for switching to be reproduced collectively and makes photographing information of the patient to be recorded on the space outside the image area on the film.

As stated above, when the commands for switching are inputted, all images of the same patient photographed until the moment of the inputting of the commands for switching are reproduced and photographing information of the patient is recorded on the space outside the image area on the film. Therefore, film assorting work and film management work of an operator are made to be easy.

The image recording apparatus mentioned above is characterized in that aforesaid command for switching is represented by a name of a patient for each photographing or by a patient ID.

Since the name of a patient or the patient ID for each photographing is inputted as stated above, it is possible to input the switching of patients for each photographing accurately and simply without fail.

The image recording apparatus mentioned above is characterized in that the photographing information of a patient is represented by a name of a patient and/or the total number of exposed films and photographing order.

The photographing information of a patient is represented by a name of a patient and/or the total number of exposed films and photographing order as stated above, and a name of a patient, the total number of exposed films and a photographing order which are observed make the film assorting work and film management work of an operator to be easy.

Further, the aforesaid object can be attained by an image recording apparatus comprising of an inputting means for image signals, a storing means for image data, and a recording means that reforms the stored image data and records them on an image recording sheet, wherein there are provided an inputting means for patient discrimination information, a storing means for the discrimination information, a discriminating means which compares the discrimination information to be inputted with patient discrimination information stored already in the storing means to find out whether the discrimination information to be inputted has been changed from the stored patient discrimination information, and a means that changes a sorter bin to which the image recording sheet is delivered when inputted patient discrimination information has been changed.

DETAILED DESCRIPTION OF THE PREFERRED EMBODIMENT

An example of the image recording apparatus of the invention will be explained as follows, referring to the drawings. In this example, a laser image writing apparatus which writes images transmitted from a diagnostic apparatus for medical use on a film by the use of a laser will be explained as an image recording apparatus.

Figure 1:
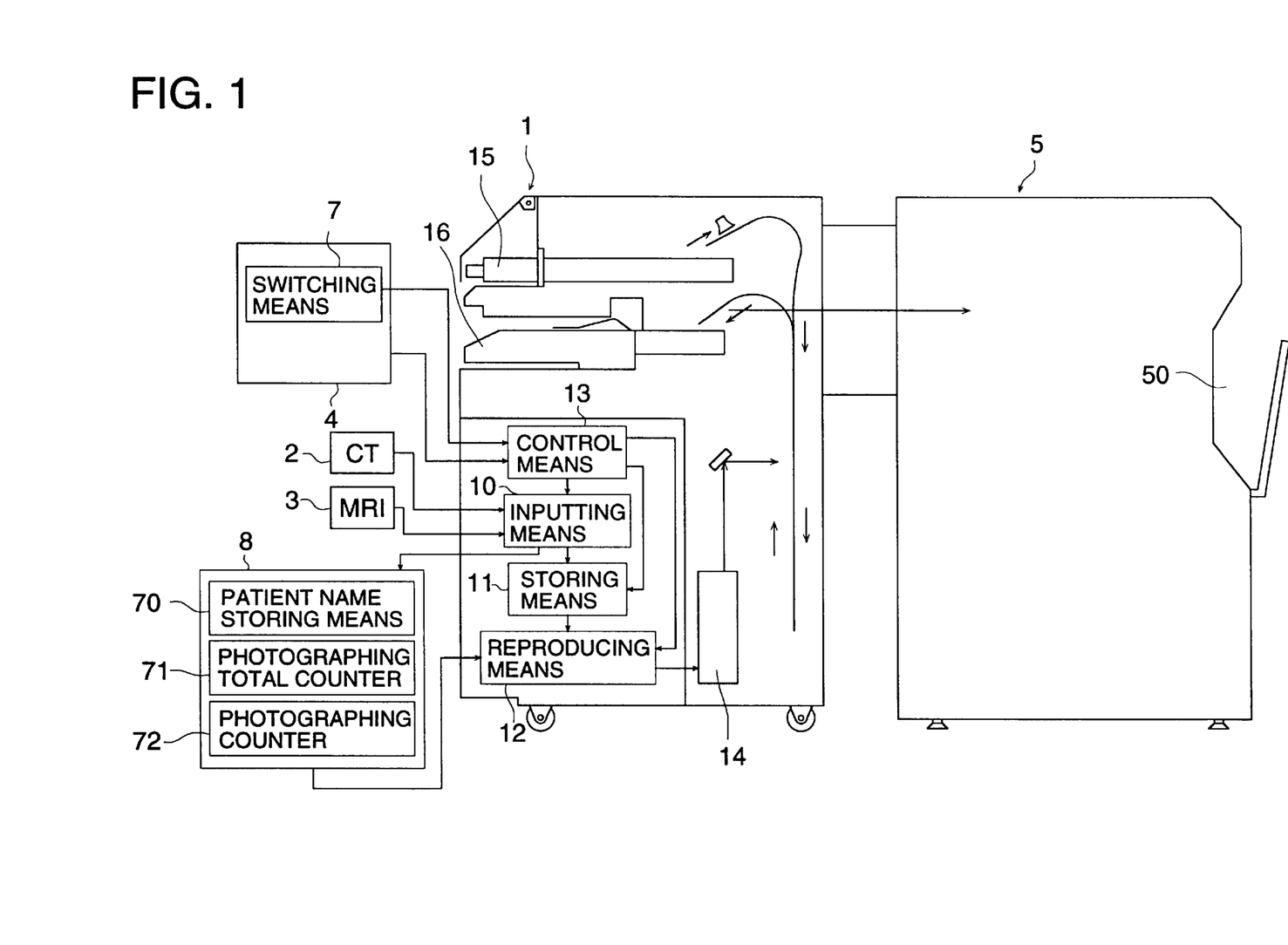
Fig. 1 a schematic diagram of a system of a laser image writing apparatus.
Figure 2:
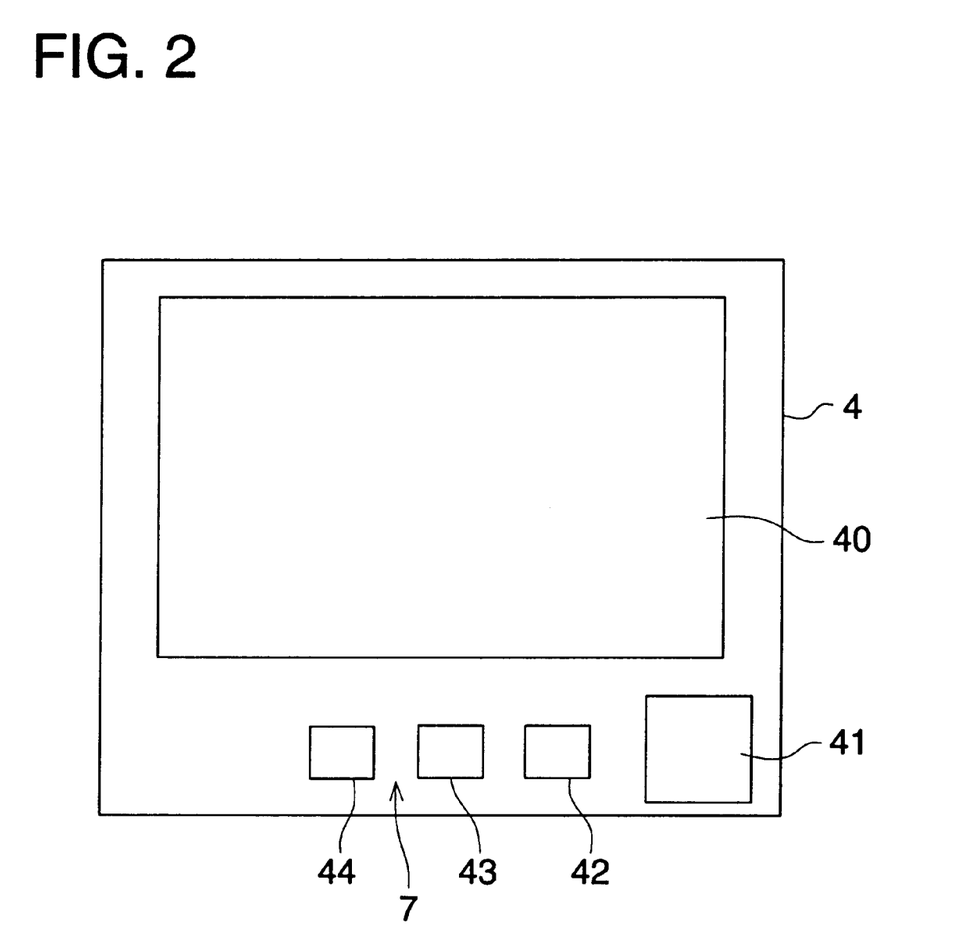
FIG. 2 is a plan view of a display and operating portion.

FIG. 1 is a schematic diagram of a system of a laser image writing apparatus, and FIG. 2 is a plan view of a display-operating portion. Laser image writing apparatus 1 writes images transmitted from a diagnostic apparatus for medical use such as CT2, MRI3 or the like on a film by the use of a laser.

For the purpose of image output by means of the laser image writing apparatus 1, an operator of a diagnostic apparatus for medical use conducts format information setting, LUT setting, image storing and start of printing operations for determining layout for printing plural images on a single film sheet, on display-operating portion 4 connected to the laser image writing apparatus 1. On the display-operating portion 4, there are provided display portion 40, store-switch 41, print-switch 42 and study-switch 43.

On the laser image writing apparatus 1, there are provided inputting means 10 that inputs image signals, storing means 11 that stores image signals inputted from the inputting means 10, reproducing means 12 that reproduces image signals from the storing means 11, and control means 13 that controls the foregoing. The control means 13 controls the inputting means 10, storing means 11 and the reproducing means 12, based on the commands from the display-operating portion 4. In the inputting means 10, image signals transmitted from a diagnostic apparatus for medical use such as CT2, MRI3 or the like are inputted, and image signals inputted from the inputting means 10 are stored in the storing means 11. The reproducing means 12 reproduces image signals from the storing means 11 and sends them to exposure portion 14, and thereby, a laser beam from the exposure portion 14 records images on a film fed out of supply magazine 15.

After that, the film is developed by automatic processing machine 5 that is connected directly, and the film thus processed is fed out to film storing portion 50 where the film is stored. Or, the film is stored temporarily in receive magazine 16 which is removed and then is set on automatic processing machine 5 which is away from the laser image writing apparatus 1 so that the film is developed.

The laser image writing apparatus 1 is provided with patient photographing information storing means 8 which records patient photographing information and switching means 7 which inputs commands for switching of patients for each photographing, and when commands for switching are inputted from the switching means 7, the control means 13 controls the storing means 11 and the reproducing means 12 to make all images of the same patient photographed until the moment of the inputting of the commands for switching to be reproduced collectively and makes photographing information of the patient to be recorded on the space outside the image area on the film. Though the switching means 7 comprises a of study switch 43 provided on the display-operating portion 4, it may also be composed of information input 44 that inputs a patient name or patient ID for each photographing.

For example, when photographing of 4 sheets for patient A under CT2 and photographing of 4 sheets for patient B under MRI3 are conducted simultaneously, films come out of an automatic processing machine randomly in the photographing order, namely in the order of storing images in a storing means, such as in the order of $A_1$, $B_1$, $B_2$, $A_2$, . . . , $B_4$ and $A_4$ in the case of a conventional method. However, in the case of the image recording appratus of the invention, control is performed so that printing or exposure can not be conducted until the moment of completion of photographing of 4 sheets for patient A, and when photographing of 4 sheets for patient A is completed and signals for switching to the next patient are inputted, images of the patient A are outputted collectively from the storing means as $A_1$, $A_2$, $A_3$ and $A_4$.

As stated above, when commands for switching are inputted through operations of the switching means 7, all images of the same patient photographed until the moment of the inputting of the commands for switching are reproduced collectively and photographing information of the patient is recorded on the space outside the image area on the film. Therefore, film assorting work and film management work of an operator are made to be easy.

A command for switching may be either a patient name for each photographing or a patient ID, and by inputting a patient name for each photographing or a patient ID, it is possible to input the switching of a patient for each photographing accurately and simply without fail.

Patient photographing information storing means 8 comprises patient name recording means 70 which stores a patient name of patient photographing information, photographing total counter 71 which stores the total number of exposed films, and photographing counter 72 which stores a photographing order, and due to the arrangement in which the patient name, the total number of exposed films and photographing order are recorded on film F, an operator can sort films of patients and control films easily.

Figure 3:
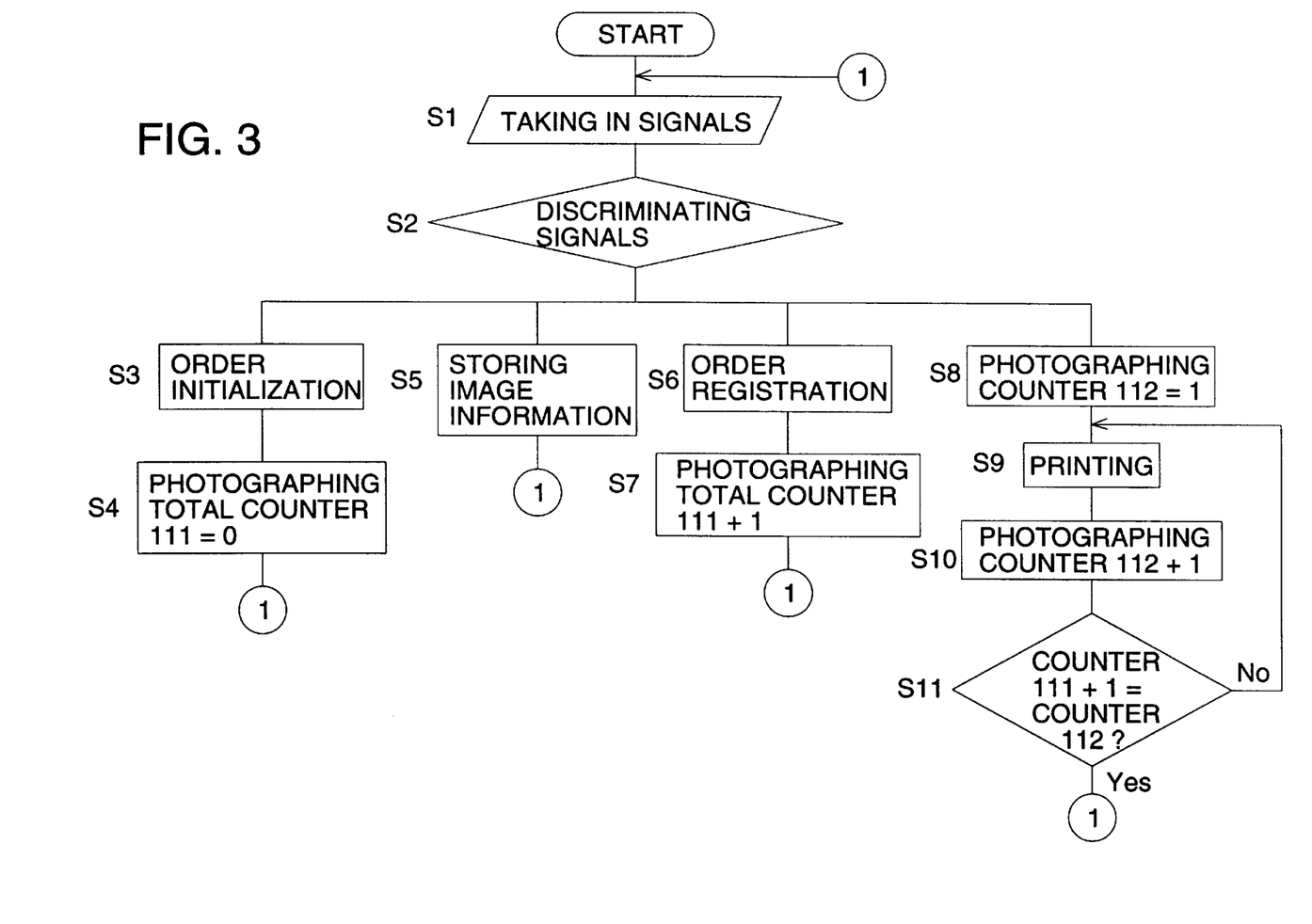
FIG. 3 is a flow chart of operations of a laser image writing apparatus.
Figure 4:
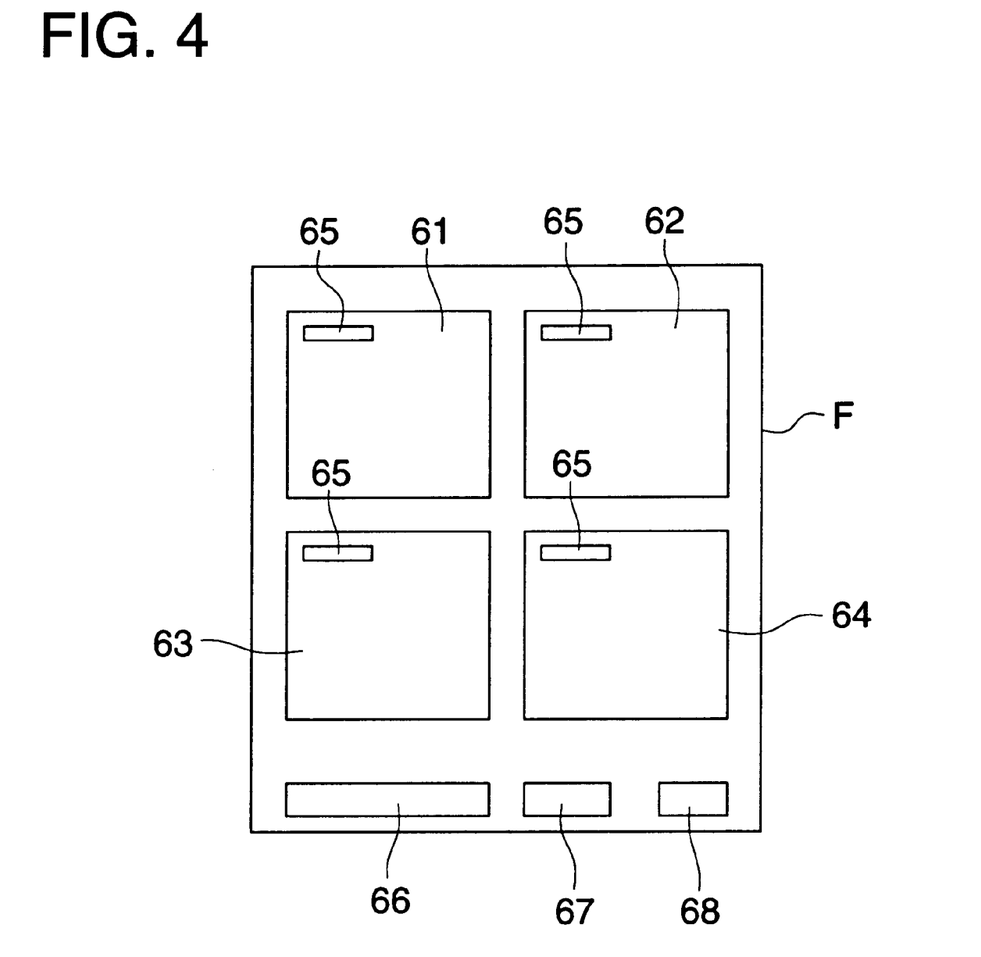
FIG. 4 is a diagram showing an example of film writing.

Next, an example for photographing of 4 frames for the same patient will be explained as follows, referring to FIGS. 3 and 4. FIG. 3 is a flow chart of operations of a laser image writing apparatus and FIG. 4 is a diagram showing an example of writing on a film.

In FIG. 3, signals from display operating portion 4 are taken in in step S1, and the signals are judged in step S2. In the step S2, when switching of a patient is recognized by an input of study switch 43 (or of a patient of photographing or patient ID by information input 44), for example, a printing order is initialized in step S3, the photographing total counter 71 is 0-cleared, and a sequence is moved to step S1.

When store switch 41 is operated, signals are taken in in step S1, the sequence is moved to step S5 by judgment in step S2 where image data equivalent in terms of quantity to the necessary number of formats are stored, and the sequence proceeds to step S1.

Then, when print switch 42 is operated, signals are taken in in step S1 in the same manner as in the foregoing, and the sequence is moved to step S6 by judgment in step S2. In this step, an operation for recording on a film is not started, and registration is made in step S6 as the first frame for the patient coming under its turn in the print waiting sequence, and the photographing total counter 71 is subjected to addition of +1 in step S7, thus, a photographing page is established.

In succession, an operator operates store switch 41, and conducts storing work for the second sheet in step S5 in the same way as in the previous step, then operates print switch 42 to start printing. Due to this, the order is registered as the second frame of the patient (step S6), and the photographing total counter 71 is subjected to addition of +1 (step S7), and the sequence proceeds to step S1. This operation is repeated until the photographing for the fourth frame is completed.

An operator inputs the completion of photographing for the patient through input of study switch 43 (or a patient or patient ID of photographing by information input 44). Due to this, signals are taken in in step S1, the sequence is moved to step S8 by judgment in step S2, then print waiting for the patient is canceled, and thereby, an action for writing on a film is started. Namely, in step S8, 1 is entered in photographing counter 72 so that printing is started.

In step S9, stored image information is first subjected to expanded interpolation and is written on the positions of image recording areas 61–64 of film F as shown in FIG. 4, in the case of 4-frame format. Further, patient ID 65 overwritten in images is recorded. Next, patient photographing information stored in patient name storing means 70 is recorded on prescribed input patient ID recording area 66 which is outside an image area of film F. Then, contents of photographing counter 112 are written on prescribed photographing counter content recording area 67 which is outside an image area of film F. After that, contents of photographing total counter 71 are written on photographing total counter content recording area 68.

Then, contents of photographing counter 72 are subjected to addition of +1 in step S10, and they are compared with contents of photographing total counter 71 +1 in step S11. When the contents are the same as each other, the sequence skips a printing sequence, and when they are different from each other, the sequence moves to step S9 and starts printing operations for the second frame in succession.

In the same manner as in the foregoing, operations of writing on a film for the second, third and fourth frames are performed. Namely, the total number of exposed frames 1/4, 2/4, 3/4 and 4/4 from the first film F for the same patient and their photographing order are recorded.

Film F thus written thereon is either sent to automatic processing machine 5 directly connected, or stored in receive magazine 16 and then sent to automatic processing machine 5 installed separately, to be processed and taken out to film storing portion 50 to be stored therein.

Accordingly, an operator can sort films easily by discriminating patients from a plurality of films F stored by means of patient ID 65 overwritten in images. Even when films F are out of order, photographing order for them can easily be cleared, which is an advantageous point. When switching of patients is conducted by an input of a patient name or patient ID, its contents can be written on input patient ID recording area 66. In this case, letters used for writing are greater than those used for judging a patient name by observing patient ID 65 overwritten in images, and a writing position is fixed. Therefore, patients can be discriminated more easily.

As stated above, there are provided, in the invention, a patient photographing information storing means which records patient photographing information, a switching means which inputs commands for switching patients for each photographing, and a control means which makes, when the switching commands are inputted, the images of the same patient photographed until the moment of the inputting of the commands for switching to be reproduced on a film collectively and makes patient photographing information to be recorded on the space outside an image area on the film. Therefore, when the switching commands are inputted, the images of the same patient photographed until the moment of the inputting of the commands for switching are reproduced on a film collectively and patient photographing information is recorded on the space outside an image area on the film. Therefore, an operator can sort films and conduct film management work easily.

Since a name of a patient or patient ID for each photographing is inputted in the invention, it is possible to input the switching of patients for each photographing accurately and simply without fail.

Since photographing information of a patient is represented by a name of a patient and/or the total number of exposed films and photographing order in the invention, it is possible to conduct film assorting work and film management work easily by observing the records of the name of a patient, the total number of exposed films and photographing order.

Another example of the invention will be explained as follows.

Figure 5:
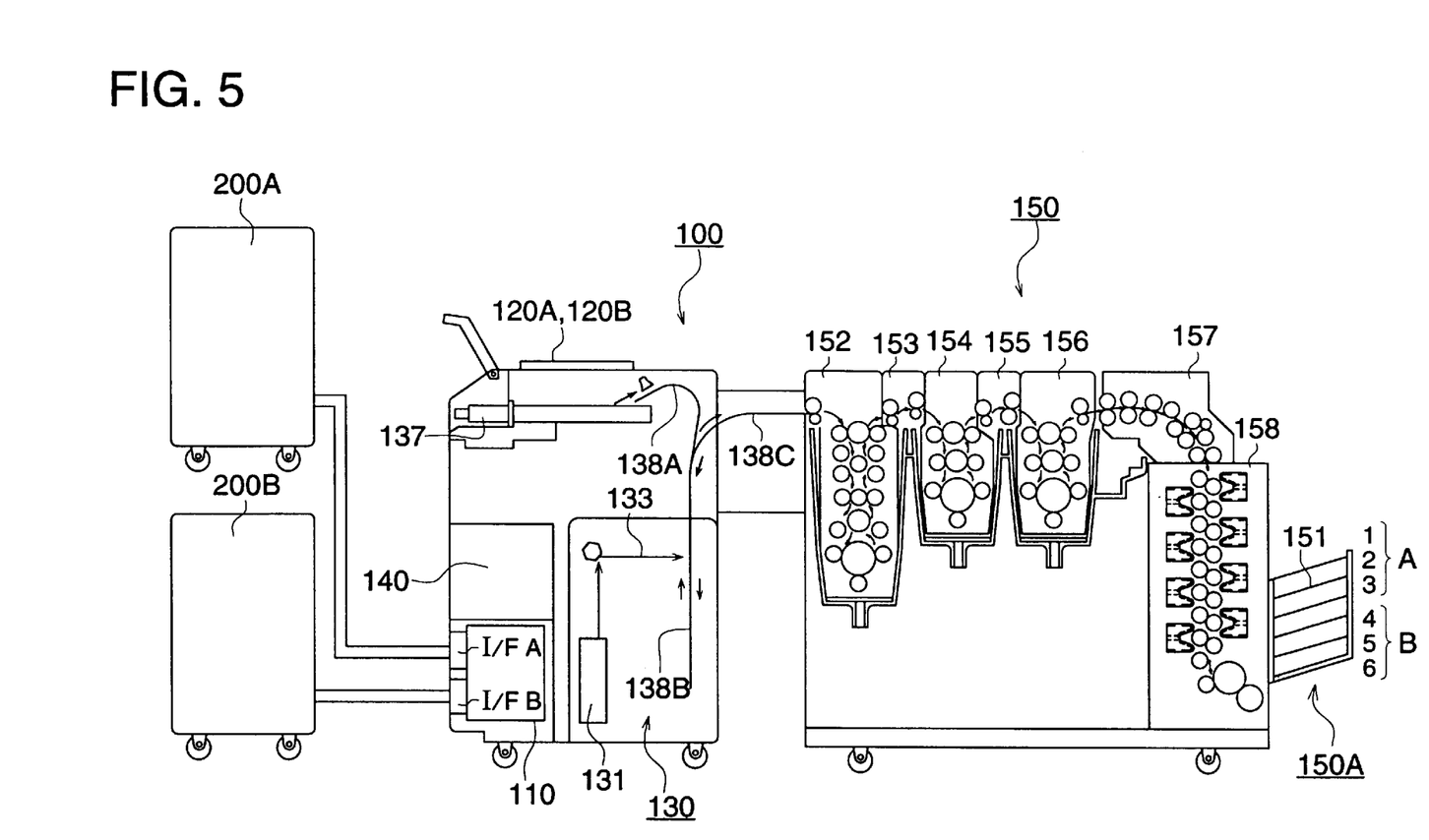
FIG. 5 is a sectional side view of an example wherein an image recording apparatus of the invention is connected with a diagnostic apparatus for medical use.
Figure 6:
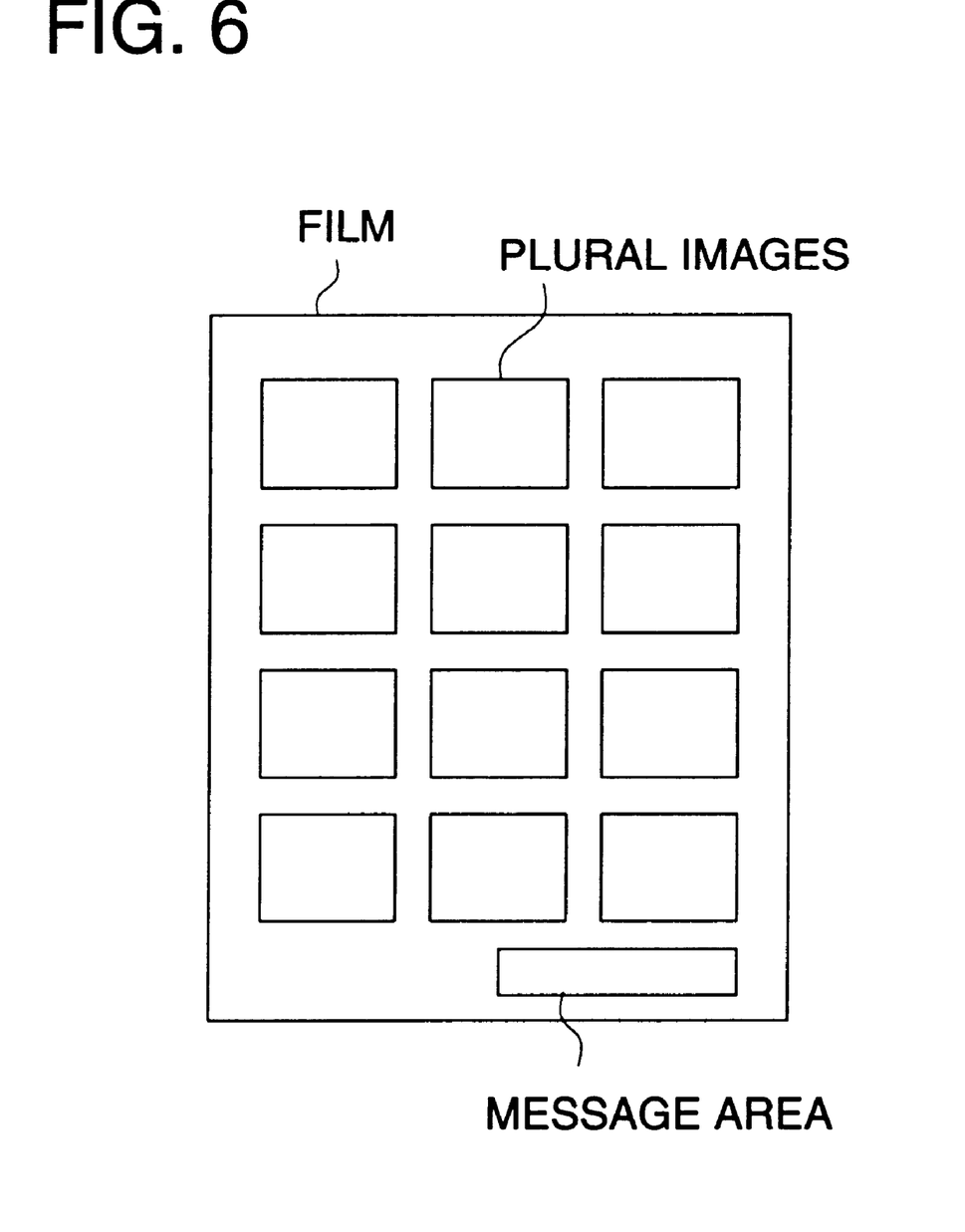
FIG. 6 is a plan view of a sample in which a plurality of tomograms are printed on a film sheet.
Figure 7:
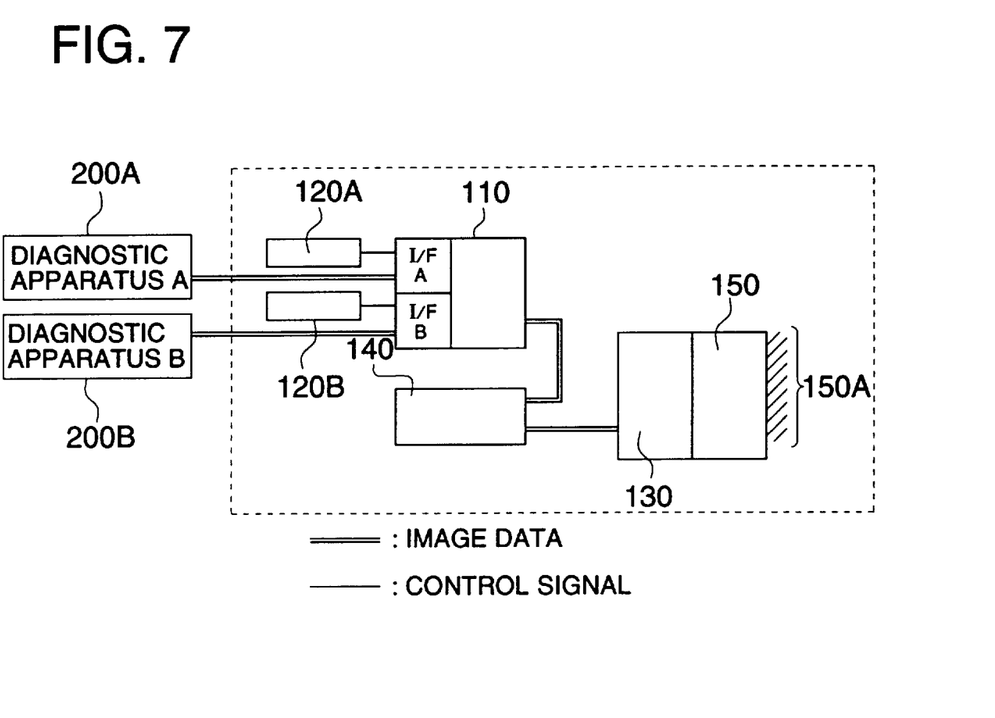
FIG. 7 is a block diagram showing a flow of image data and control signals in FIG. 5.
Figure 8:
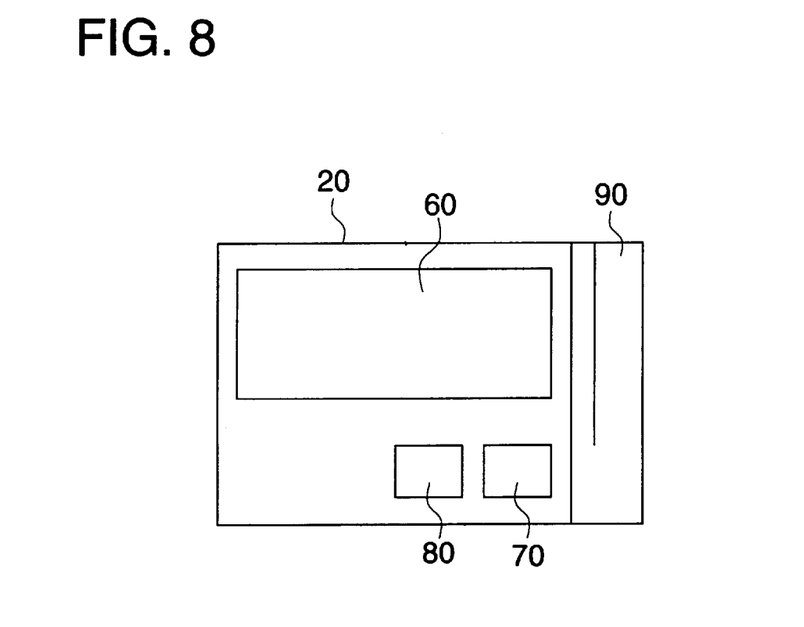
FIG. 8 is a plan view of an operation panel on an operating portion.
Figure 9:
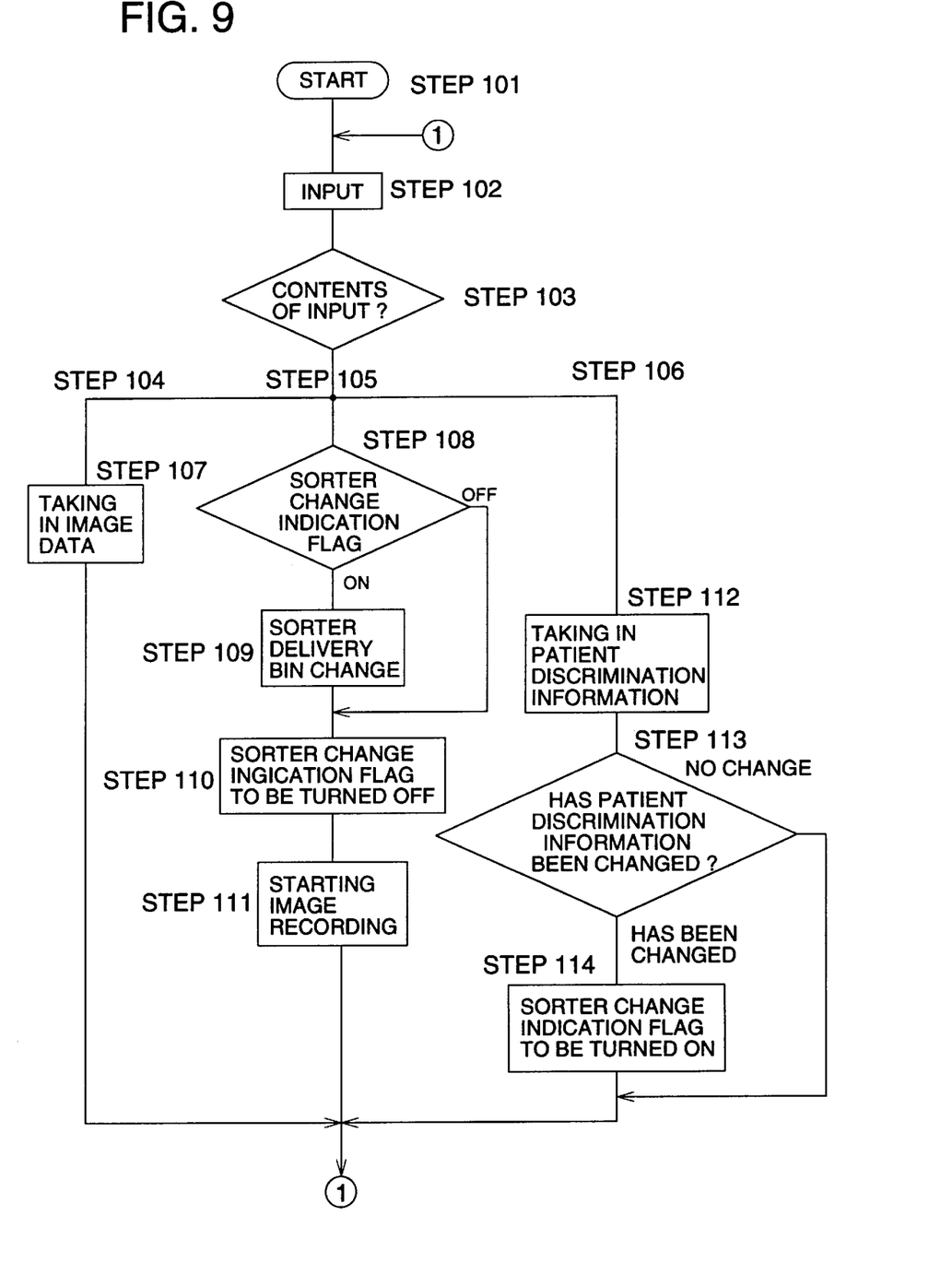
FIG. 9 is a flow chart showing operations in an example of an image recording apparatus of the invention.

FIG. 5 is a sectional side view of an example wherein an image recording apparatus 100 of the invention is connected with medical diagnostic apparatus 200. FIG. 6 is a plan view of a sample in which a plurality of photographing information such as tomograms coming from a medical diagnostic apparatus are printed on a single film sheet, and FIG. 7 is a block diagram showing a flow of image data and control signals in FIG. 5. FIG. 8 is a plan view of an operation panel on an operating portion, and FIG. 9 is a flow chart showing operations in an example of an image recording apparatus of the invention.

An image recording apparatus 100 takes photographing image information coming from medical diagnostic apparatus 200 which photographs tomograms of the affected part of a patient such as a CT or an MRI, on image data inputting portion 110 through its interface I/F, then, makes the information to be stored in entire control portion 140 having a storing means and sends, the information to image forming portion 130. A command of the foregoing makes a sheet of film to be taken out of supply magazine 137 and to advance through transport path 138A, and modulated image information from laser light source 131 is printed, through a polygon mirror, on that film located on transport path 138B. When this printing of images in prescribed number of sectional planes on the film is completed, the film reverses on the transport path 138B and enters branch transport path 138C to be fed into processing section 150. The film passes through developing tank 152, fixing tank 154, washing tank 156, drying section 158 and cross-over racks 153, 155 and 157 each squeezing a solution positioned between tanks and feeding a film to the following tank, and then, is assorted on sorter 150A having bin 151 for assorting for each patient, to be picked up in the form of print images shown in FIG. 6.

Though operation panel 120 is mounted on the top of image recording apparatus 100 in FIG. 5, the operation panel 120 may also be placed by medical diagnostic apparatus 200.

Further, the image recording apparatus 100 can be connected with a plurality of medical diagnostic apparatuses exemplified, for example, by two medical diagnostic apparatuses 200A and 200B. When two medical diagnostic apparatuses 200A and 200B are connected to the image recording apparatus as stated above, aforesaid operation panel 120 can also be divided into two operation panels 120A and 120B.

FIG. 7 represents a block diagram showing how the signals are transmitted between the image recording apparatus 100 and the medical diagnostic apparatus 200.

FIG. 8 is a plan view showing an arrangement on the operation panel 120. On the operation panel 120, there are provided display portion 160, store switch 170 for taking in images, image print switch 180 and patient discrimination information inputting device 190.

An ID card which corresponds to a consultation ticket carried by each patient is inserted into the patient discrimination information inputting device 190 where information of the ID card is read and stored. Contents to be read include a name, a date of birth and an identification number. An arrangement is made so that it is possible to collate photographing information with ID card information, to judge whether they are exactly the same or not and to identify the photographing information. Namely, an affected part of the patient corresponding to the ID card is photographed by the medical diagnostic apparatus 200 without fail, and its information is transmitted to the image recording apparatus 100 to be stored therein, and is further recorded on a film which is processed and delivered on prescribed bin 151. In some cases, data on the ID card are stored in entire control portion 140 and can be printed on a message area shown on a printing sample in FIG. 6, for example.

As stated above, all an operator has to do is to insert an ID card handed from a patient into the patient discrimination information inputting device 190 on the operation panel 120, then to press the store switch 170 for taking in images to await completion of photographing of one patient, and then to just press print switch 180. After that, the image recording apparatus 100 operates automatically without fail to conduct image recording and switching of sorter bins. Therefore, recorded images requiring simple, easy and sure operations can be obtained.

Or, a key board is provided as a means for inputting signals which indicate that a patient is switched every time the patient is switched, without providing the patient discrimination information inputting device 190 into which an ID card is inserted, and necessary patient discrimination information is inputted in the key board, then the store switch 170 for taking in images is pressed to wait completion of photographing of one patient, and then print switch 180 is just pressed. After that, the image recording apparatus 100 operates automatically without fail to conduct image recording and switching of sorter bins. Therefore, recorded images requiring simple, easy and sure operations can be obtained.

In an ordinary operation, an operator (1) first inputs patient discrimination information. (2) Next, the operator presses store switch 170 once or several times for taking in images, and takes in images matching one image recording sheet in terms of volume from a diagnostic apparatus. (3) Then, the operator presses print switch 180 to start recording on an image recording sheet. (4) Aforesaid items (2) and (3) are repeated until photographing of images for one patient is completed. (5) After the patient is switched, aforesaid items (1)–(4) are repeated.

The image recording sheet recorded thereon is delivered on a sorter bin allotted for each patient from sorter 50A in an image recording sheet delivering portion.

Next, operations of an example of the image recording apparatus of the invention will be explained as follows, referring to a flow chart.

Image recording apparatus 100 that is connected with medical diagnostic apparatus 200 to be ready for operation comes under the state of being capable of inputting patient information and of taking in images. This state is step 101 which is a starting point of a flow chart.

Before entering operations of this flow chart, a range of the bin numbers of delivery bin 151 of sorter 150A is designated for each diagnostic apparatus by an unillustrated setting means. Within a range of the bin numbers thus designated, switching of delivery bin is conducted. For example, when a range of delivery bins of diagnostic apparatus 200A is designated as bin numbers 1, 2 and 3 in advance as shown in FIG. 5 and a range of delivery bins of diagnostic apparatus 200B is designated as bin numbers 4, 5 and 6 in advance, switchings of 1→2, 2→3 and 3→1 are made in diagnostic apparatus 200A and switchings of 4→5, 5→6 and 6→4 are made in diagnostic apparatus 200B.

In the state of step 102, inputting by means of operation panel 120 is delayed.

On the operation panel 120, when there is an input of store switch 170 for image taking in, a step results in step 104, when there is an input of print switch 180, a step results in step 105, and when there is an input of patient ID card as patient discrimination information, a step results in step 106, and the processing branches.

When there is an input of patient discrimination information resulting in branching to step 106, inputted information is stored in the course of step 112, and whether the patient discrimination information has been changed or not is compared, in step 113, with patient discrimination information stored already. When the patient discrimination information has been changed, sorter change indication flag is turned ON in step 114 and a sequence returns to step 102 of input. When the patient discrimination information has not been changed, processing is not conducted, and a sequence returns to step 102.

When there is an input of print switch 180 in step 105, there is confirmed first whether the contents of the sorter change indication flag is ON or OFF in step 108.

When the sorter change indication flag is ON, delivery bins are changed based on the range of delivery bins of a sorter designated in advance (aforesaid 1, 2 and 3 in 200A or 4, 5 and 6 in 200B), and a sorter change flag is returned to OFF in step 110, and image recording is started in step 111. When the sorter change indication flag is OFF, bins of a sorter are not changed and processing of start recording images in aforesaid step 111 is continued.

In the step 111 of start recording images, a sequence enters an operation of recording image data stored in the course of processing of image taking in on an image recording sheet in image forming portion 130, to be the state of waiting input of step 102.

Due to the invention, patient ID information can be compared with patient photographing information accurately and easily through connection of a medical diagnostic apparatus and an image recording apparatus, and it has become possible to simplify an operation panel and to make an overall apparatus to be small with less manufacturing cost.

What is claimed is:

1. An apparatus for controlling a recording means comprising:

a first input means for inputting image information items with respect to a plurality of objects; a second input means for inputting a change signal representing a change of a given one of the plurality of objects whose image is to be recorded;

a first memory for storing a plurality of the image information items inputted by the first input means; and a control means for selecting at least one of the image information items stored in the first memory a given one of the image information items which corresponds to the given one of the plurality of objects whose image is to be recorded, and for controlling the recording means to record the selected image information item on a recording sheet, responsive to the input of the change signal by the second input means.

2. The apparatus of claims 1, wherein:

the change signal represents the change of the object from a first object to a second object; and the control means selects from the first memory image information items corresponding to the first object and controls the recording means to record the selected image information, responsive to the input of the change signal by the second input means.

3. The apparatus of claim 1, further comprising:

a plurality of the first input means; and a plurality of the second input means each corresponding to a respective one of the plurality of the first input means;

wherein the control means, in response to the input of the change signal by one of the plurality of second input means, selects from the first memory image information items inputted by the one of the first input means corresponding to the second input means which has input the change signal, and controls the recording means to record the selected image information items.

4. The apparatus of claimer 3, wherein:

the plurality of the first input means input photographing information of the object;

the apparatus further comprises a second memory for storing the input photographing information; and the control means controls the recording means to output the photographing information stored in the second memory together with the selected image information items in response to the input of the change signal by one of the plurality of second input means.

5. The apparatus of claim 4, wherein the photographing information of the object comprises at least one of an identification code identifying the object, a total number of photographed sheets and a photographing order.

6. The apparatus of claim 4, further comprising:

a sorter including a bin for sorting the recording sheet; and changing means for changing the bin in response to the photographing information.

7. The apparatus of claim 4, further comprising:

a sorter including a bin for sorting the recording sheet;

discriminating means for discriminating whether the input photographing information of the object input is identical to the photographing information stored in the second memory; and changing means for changing the bin when the discriminating means discriminates that the input photographing information of the object is not identical to the photographing information stored in the second memory.

8. The apparatus of claim 3, wherein the change signal comprises an identification code identifying the object.

9. The apparatus of claim 3, wherein each of the plurality of first input means inputs image information items transmitted from a corresponding one of a plurality of medical image diagnostic apparatuses.

10. The apparatus of claim 3, wherein the plurality of second input means comprise keyboards.

11. The apparatus of claim 3, wherein the plurality of second input means comprise card readers.

12. The apparatus of claim 1, wherein:

the change signal designates the object whose image is to be recorded; and the control means cancels a waiting order to delay recording the selected image information item and controls the recording means to start recording the selected image information item on the recording sheet, responsive to the input of the change signal by the second input means.

13. The apparatus of claim 12, wherein the second input means inputs the change signal designating the object whose image is to be recorded when a photographing operation with respect to the object is completed.

14. An apparatus for controlling a recording means, comprising:

a first input means for inputting image information items with respect to an object;

a second input means for inputting a change signal representing a change of the object;

a first memory for storing a plurality of the image information items inputted by the first input means; and a control means for selecting at least one of the image information items stored in the first memory and for controlling the recording means to record the at least one selected image information item on a recording sheet, responsive to the input of the change signal by the second input means;

wherein the change signal represents the change of the object from a first object to a second object; and wherein the control means selects from the first memory image information items corresponding to the first object and controls the recording means to record the selected image information, responsive to the input of the change signal by the second input means.

* * * * *